(12) United States Patent
Suganuma

(10) Patent No.: US 11,695,133 B2
(45) Date of Patent: Jul. 4, 2023

(54) FUEL CELL SYSTEM AND METHOD OF CONTROLLING FUEL CELL SYSTEM

(71) Applicant: TOYOTA JIDOSHA KABUSHIKI KAISHA, Toyota (JP)

(72) Inventor: Hiroyuki Suganuma, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/449,361

(22) Filed: Sep. 29, 2021

(65) Prior Publication Data

US 2022/0109169 A1 Apr. 7, 2022

(30) Foreign Application Priority Data

Oct. 1, 2020 (JP) .............................. JP2020-166958

(51) Int. Cl.
*H01M 8/04119* (2016.01)
*H01M 8/0438* (2016.01)
(Continued)

(52) U.S. Cl.
CPC ... *H01M 8/04119* (2013.01); *H01M 8/04388* (2013.01); *H01M 8/04089* (2013.01);
(Continued)

(58) Field of Classification Search
CPC ......... H01M 8/04388; H01M 8/04097; H01M 8/04664; H01M 8/04753; H01M 8/04089;
(Continued)

(56) References Cited

U.S. PATENT DOCUMENTS

2017/0250420 A1* 8/2017 Nakagawa ........ H01M 8/04664

FOREIGN PATENT DOCUMENTS

| JP | 2010049914 A | | 3/2010 |
|---|---|---|---|
| JP | 2018160363 | * | 10/2018 |
| JP | 2018160363 A | | 10/2018 |

\* cited by examiner

*Primary Examiner* — Matthew W Van Oudenaren
(74) *Attorney, Agent, or Firm* — Hunton Andrews Kurth LLP

(57) ABSTRACT

The fuel cell system includes: a fuel cell; an anode supply pipe; a fuel gas supplier disposed at the anode supply pipe, the fuel gas supplier configured to adjust a supply quantity of a fuel gas to be supplied to the fuel cell; an ejector disposed at the anode supply pipe at a position between the fuel gas supplier and the anode supply port; an anode circulation pipe connected to the anode discharge port and the ejector; a circulation stop unit disposed at the anode circulation pipe, the circulation stop unit configured to stop circulation of the fuel gas through the anode circulation pipe; a pressure sensor configured to detect a pressure in the anode supply pipe at a position between the ejector and the anode supply port; and a controller. When a first pressure acquired from the pressure sensor is equal to or less than a predetermined lower limit value, the controller controls the fuel gas supplier to perform constant quantity supply control to supply the fuel gas of a predetermined supply quantity, and controls the circulation stop unit to perform circulation stop control to stop the circulation through the anode circulation pipe, and the controller determines abnormality at the ejector and the anode circulation pipe by using a second pressure acquired from the pressure sensor after the fuel gas supplier performs the constant quantity supply control and the circulation stop unit performs the circulation stop control.

5 Claims, 5 Drawing Sheets

(51) Int. Cl.
*H01M 8/04089* (2016.01)
*H01M 8/04664* (2016.01)
*H01M 8/04746* (2016.01)

(52) U.S. Cl.
CPC .... *H01M 8/04097* (2013.01); *H01M 8/04671* (2013.01); *H01M 8/04679* (2013.01); *H01M 8/04686* (2013.01); *H01M 8/04753* (2013.01)

(58) Field of Classification Search
CPC ......... H01M 8/04671; H01M 8/04679; H01M 8/04686; H01M 8/04447; H01M 8/04798
See application file for complete search history.

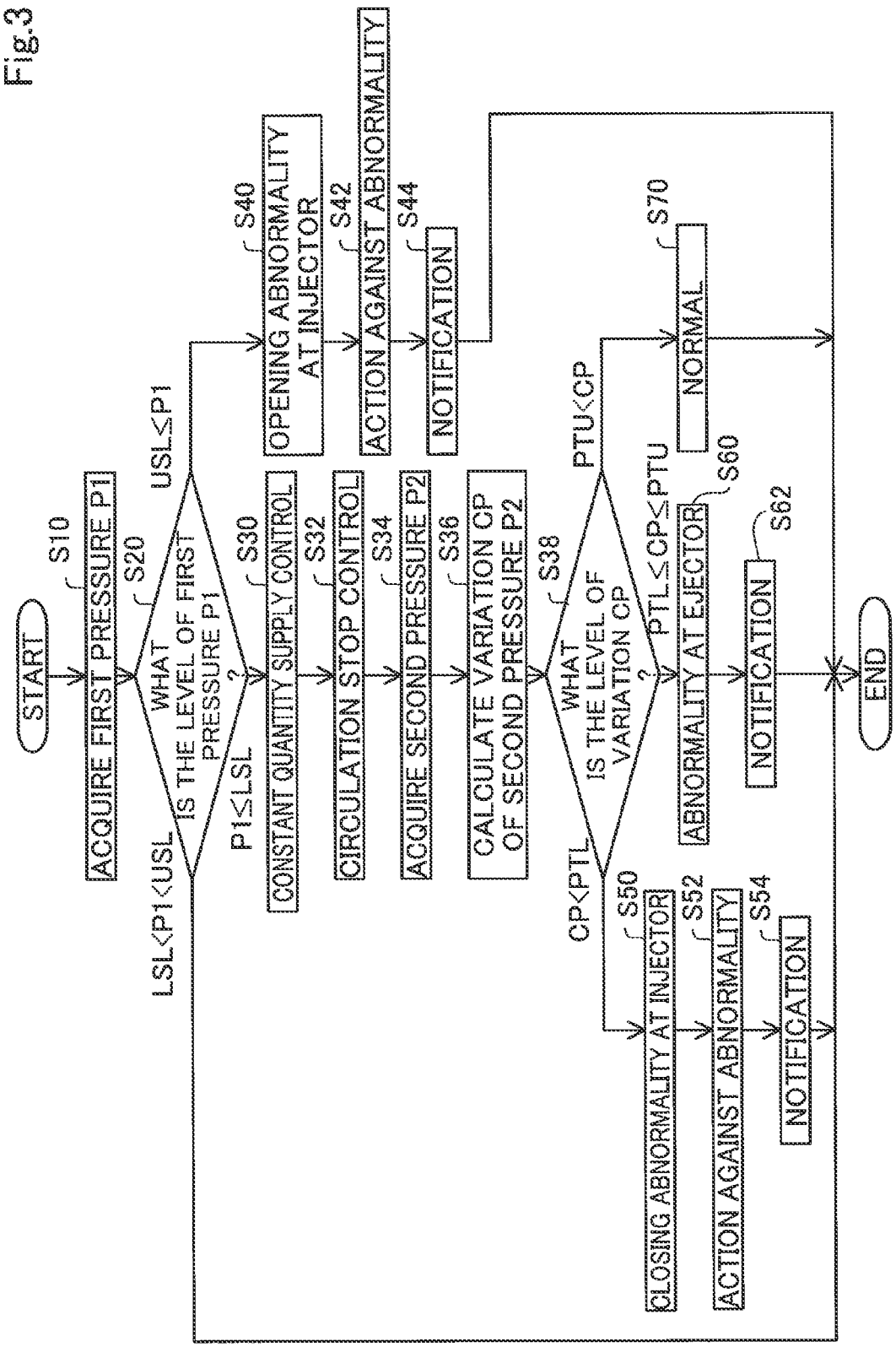

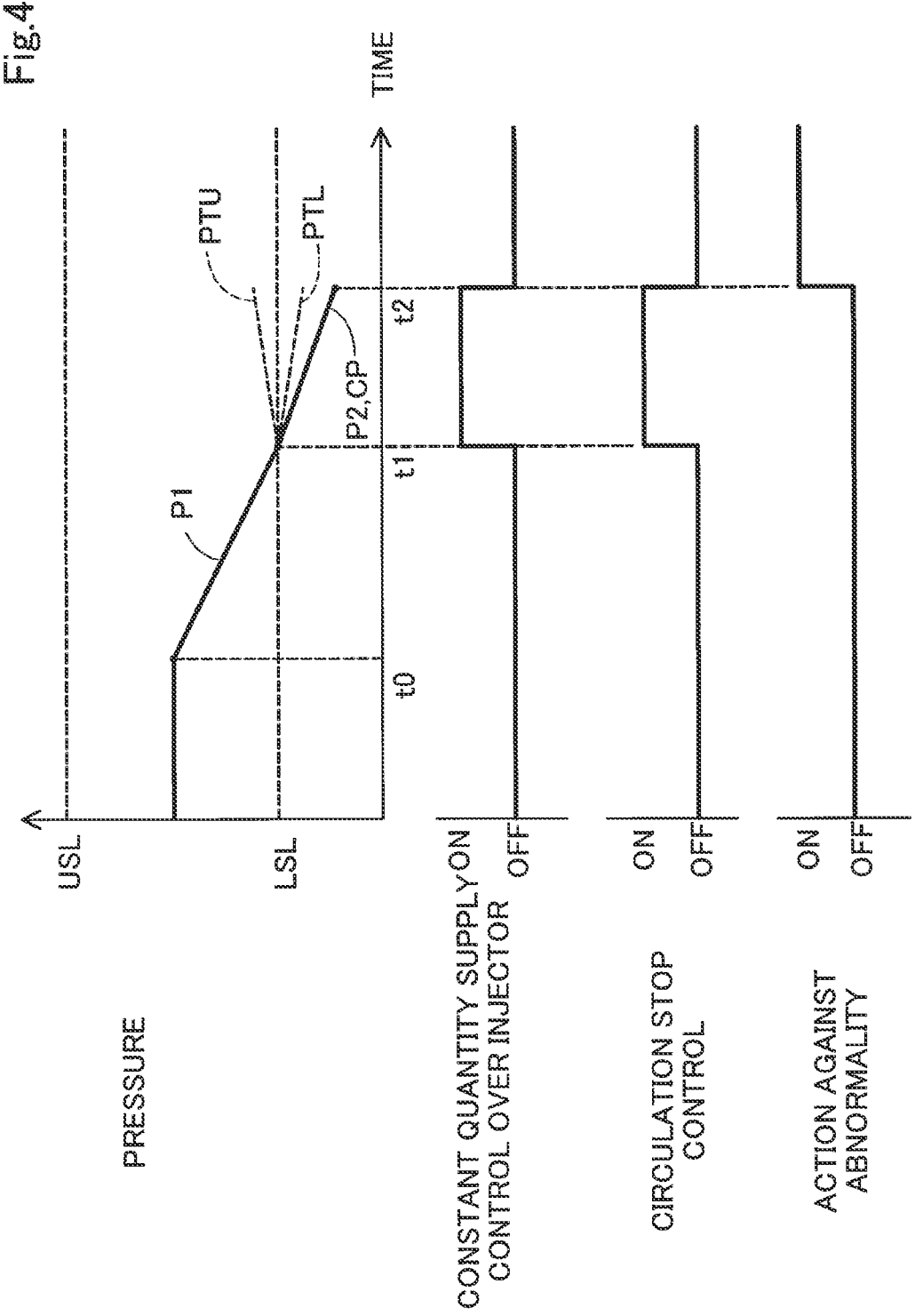

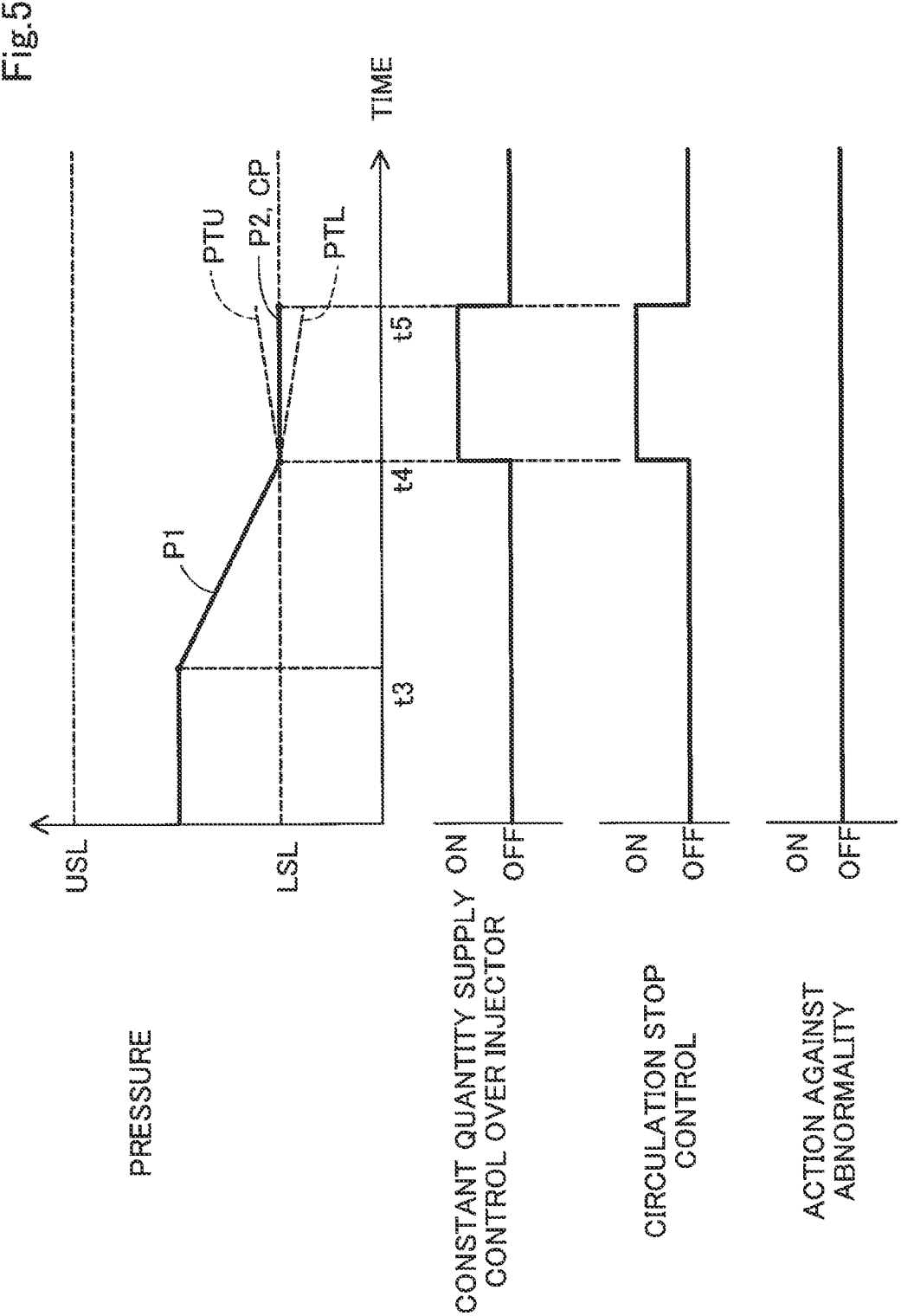

FUEL CELL SYSTEM AND METHOD OF CONTROLLING FUEL CELL SYSTEM

CROSS-REFERENCE TO RELATED APPLICATIONS

This application claims priority from Japanese patent application P2020-166958 filed on Oct. 1, 2020, the disclosure of which is hereby incorporated in its entirety by reference into this application.

BACKGROUND

Field

The present disclosure relates to a fuel cell system and a method of controlling a fuel cell system.

Related Art

A known hydrogen circulation device includes: a main flow path connecting a hydrogen gas inlet of a fuel cell stack and a hydrogen gas supplier; a fuel control valve provided in the main flow path and used for adjusting a hydrogen gas amount; a circulation path connecting a hydrogen gas outlet of the fuel cell stack and the main flow path; and an ejector provided at a junction between the main flow path and the circulation path (Japanese Patent Application Publication No. 2010-049914, for example).

A technique allowing detection of abnormality at a hydrogen gas circulation system including the ejector and the circulation path has been desired to be employed in the hydrogen circulation device.

SUMMARY

According to one aspect of the present disclosure, a fuel cell system is provided. The fuel cell system includes: a fuel cell including an anode supply port and an anode discharge port; an anode supply pipe connected to the anode supply port; a fuel gas supplier disposed at the anode supply pipe, the fuel gas supplier configured to adjust a supply quantity of a fuel gas to be supplied to the fuel cell; an ejector disposed at the anode supply pipe at a position between the fuel gas supplier and the anode supply port; an anode circulation pipe connected to the anode discharge port and the ejector; a circulation stop unit disposed at the anode circulation pipe, the circulation stop unit configured to stop circulation of the fuel gas through the anode circulation pipe; a pressure sensor configured to detect a pressure in the anode supply pipe at a position between the ejector and the anode supply port; and a controller configured to control the fuel gas supplier and the circulation stop unit, wherein when a first pressure acquired from the pressure sensor is equal to or less than a predetermined lower limit value, the controller may control the fuel gas supplier to perform constant quantity supply control to supply the fuel gas of a predetermined supply quantity, and may control the circulation stop unit to perform circulation stop control to stop the circulation through the anode circulation pipe, and the controller may determine abnormality at the ejector and the anode circulation pipe by using a second pressure acquired from the pressure sensor after the fuel gas supplier performs the constant quantity supply control and the circulation stop unit performs the circulation stop control. In the fuel cell system of this aspect, using the second pressure acquired after implementations of the constant quantity supply control and the circulation stop control makes it possible to detect abnormality at an anode gas circulation system including the ejector and the anode circulation pipe.

BRIEF DESCRIPTION OF THE DRAWINGS

FIG. 3 is a flowchart showing abnormality judgment control performed by a controller of the fuel cell system of the present embodiment;

FIG. 4 is a timing chart showing an example of a case where the controller judges that an injector has closing abnormality; and FIG. 5 is a timing chart showing an example of a case where the controller judges that the ejector has abnormality.

DETAILED DESCRIPTION

A. First Embodiment

Figure 1:
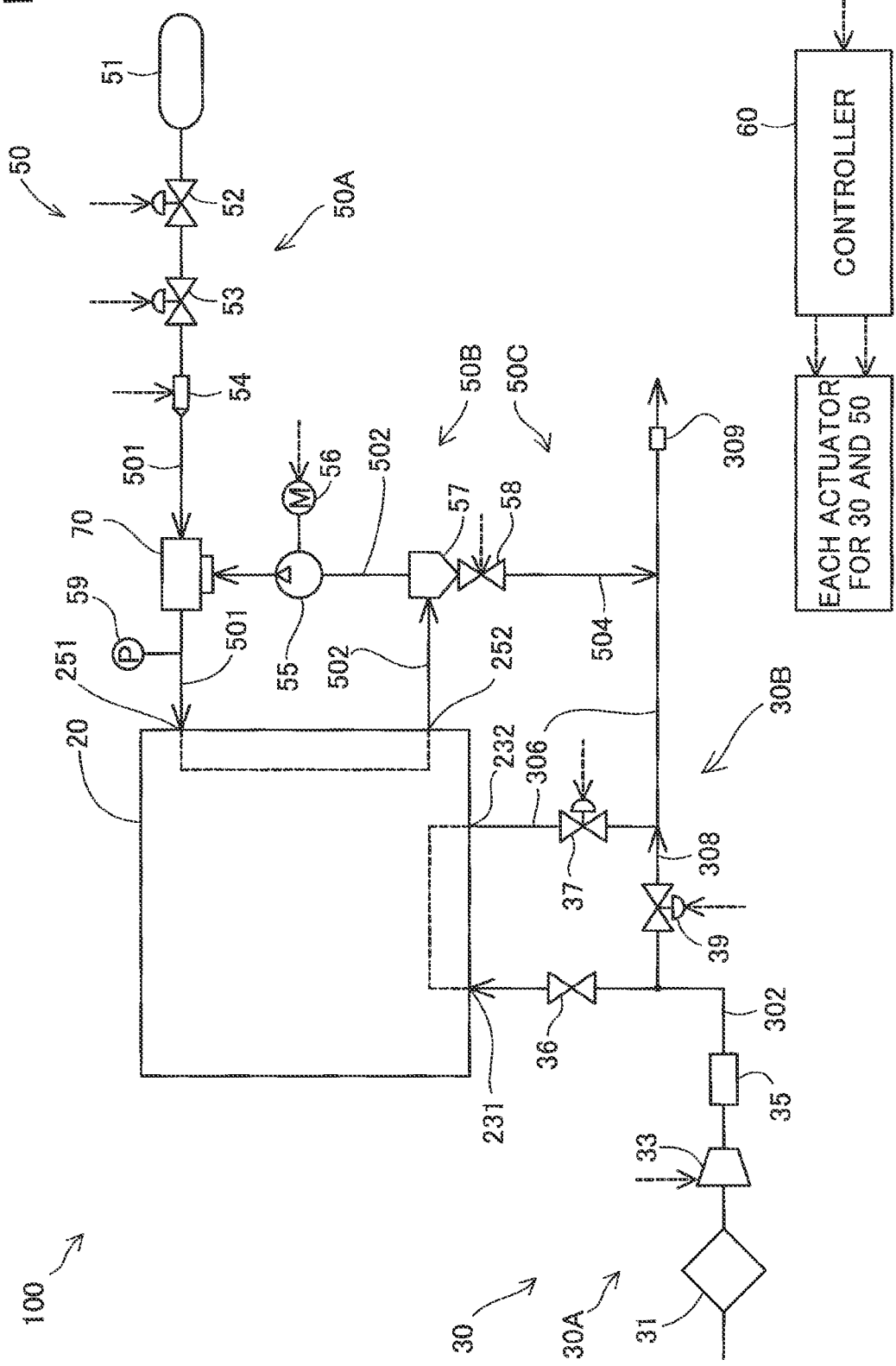
FIG. 1 is an explanatory view showing the configuration of a fuel cell system.

The configuration of a fuel cell system 100 of a first embodiment will be described by referring to FIGS. 1 and 2. FIG. 1 is an explanatory view showing the configuration of the fuel cell system 100 of the present embodiment. The fuel cell system 100 is mounted on a fuel cell vehicle using a fuel cell 20 as a driving source, for example. The fuel cell system 100 drives various types of devices included in a load using power generated by the fuel cell 20. The fuel cell system 100 includes the fuel cell 20, a controller 60, an oxidizing gas supply/discharge system 30, and a fuel gas supply/discharge system 50. The fuel cell system 100 may further include a coolant circulation system that circulates a coolant through the fuel cell 20 to adjust the temperature of the fuel cell 20, and may further include a secondary cell to function together with the fuel cell 20 as a power source for the load.

The fuel cell 20 has a stack structure with a plurality of single fuel cells each having a membrane electrode assembly (MEA) in which electrodes including an anode and a cathode are bonded to the both sides of an electrolyte membrane. The fuel cell 20 is a solid polymer fuel cell that generates power in response to supply of hydrogen gas and air as reactive gases. The generated power is used for driving the load. The load includes a drive motor for generating driving power for a fuel cell vehicle, a heater used for air conditioning in the fuel cell vehicle, etc., for example. The fuel cell 20 includes an anode supply port 251 for supply of hydrogen gas as an anode gas to the anode, an anode discharge port 252 for discharge of the hydrogen gas from the anode, a cathode supply port 231 for supply of air as an oxidizing gas to the cathode, and a cathode discharge port 232 for discharge of the air from the cathode. The fuel cell 20 is not limited to a solid polymer fuel cell but it may also be any type of fuel cell such as a phosphoric-acid fuel cell, a molten carbonate fuel cell, or a solid oxide fuel cell, for example. The fuel cell system 100 may be used as a household power supply or for stationary power generation, in addition to the use in the fuel cell vehicle.

The controller 60 is composed of a microcomputer including a microprocessor to perform logic operation, and a memory such as a ROM or a RAM, for example. In response to execution of a program stored in the memory by the microprocessor, the controller 60 performs power generation by the fuel cell 20 and various types of control over the fuel cell system 100 including constant quantity supply control and circulation stop control described later.

The oxidizing gas supply/discharge system 30 includes an oxidizing gas supply system 30A having a cathode gas supply function, and an oxidizing gas discharge system 30B having a cathode gas discharge function and a cathode gas bypass function. The cathode gas supply function means a function of supplying air containing oxygen as a cathode gas to the cathode of the fuel cell 20. The cathode gas discharge function means a function of discharging a cathode off-gas that is a discharge gas discharged from the cathode of the fuel cell 20 to the outside. The cathode gas bypass function means a function of discharging part of the cathode gas to be supplied to the outside without supplying this part of the cathode gas to the fuel cell 20.

The oxidizing gas supply system 30A has the cathode gas supply function and supplies air as the cathode gas to the cathode of the fuel cell 20. The oxidizing gas supply system 30A includes a cathode supply pipe 302, an air cleaner 31, an air compressor 33, an intercooler, 35, and an inlet valve 36.

The cathode supply pipe 302 is connected to the cathode supply port 231 of the fuel cell 20 and functions as an air supply flow path for the cathode of the fuel cell 20. The air cleaner 31 is provided in the cathode supply pipe 302 at a position closer to an air inlet port than the air compressor 33, namely, upstream from the air compressor 33. The air cleaner 31 removes foreign substances in air to be supplied to the fuel cell 20.

The air compressor 33 is provided in the cathode supply pipe 302 at a position between the air cleaner 31 and the fuel cell 20. The air compressor 33 compresses air taken in through the air cleaner 31 and feeds the compressed air to the cathode. For example, a turbo compressor is used as the air compressor 33. The air compressor 33 is driven under control by the controller 60. The controller 60 controls the number of rotations of the air compressor 33 to adjust the amount of air to be fed downstream. The controller 60 causes the air compressor 33, a bypass valve 39, and an outlet valve 37 to work cooperatively to adjust the flow rate of air to flow in the fuel cell 20 and the flow rate of air to be discharged through a cathode discharge pipe 306.

The intercooler 35 is provided in the cathode supply pipe 302 at a position between the air compressor 33 and the cathode supply port 231. The intercooler 35 cools the cathode gas increased to a high temperature by being compressed by the air compressor 33. The inlet valve 36 is an on/off valve to be opened mechanically by incoming flow of the cathode gas at a predetermined pressure. The inlet valve 36 is used for controlling flow of the cathode gas into the cathode of the fuel cell 20.

The oxidizing gas discharge system 30B has a cathode off-gas discharge function, and includes the cathode discharge pipe 306, a bypass pipe 308, the bypass valve 39, the outlet valve 37, and a discharge gas discharge port 309. The cathode discharge pipe 306 is a cathode off-gas discharge flow path having one end connected to the cathode discharge port 232 of the fuel cell 20. The cathode discharge pipe 306 is used for guiding a discharge gas from the fuel cell 20 containing the cathode off-gas to the discharge gas discharge port 309 corresponding to the other end of the cathode discharge pipe 306, and discharging the guided gas to the atmosphere. The discharge gas discharged into the atmosphere from the cathode discharge pipe 306 contains an anode off-gas from an anode discharge pipe 504 and air flowing out from the bypass pipe 308, in addition to the cathode off-gas.

The outlet valve 37 is provided in the cathode discharge pipe 306 at a position near the cathode discharge port 232. More specifically, the outlet valve 37 is arranged in the cathode discharge pipe 306 at a position closer to the fuel cell 20 than a position of connection between the cathode discharge pipe 306 and the bypass pipe 308. For example, a solenoid valve or an electric-operated valve is usable as the outlet valve 37. The controller 60 adjusts the amount of opening of the outlet valve 37 to adjust a back pressure at the cathode of the fuel cell 20.

The bypass pipe 308 is a pipe line connecting the cathode supply pipe 302 and the cathode discharge pipe 306 to each other without passing through the fuel cell 20. The bypass valve 39 is provided in the bypass pipe 308. For example, a solenoid valve or an electric-operated valve is usable as the bypass valve 39. Opening the bypass valve 39 causes at least part of the cathode gas flowing in the cathode supply pipe 302 to flow into the cathode discharge pipe 306. The controller 60 adjusts the amount of opening of the bypass valve 39 to adjust the flow rate of the cathode gas to flow into the bypass pipe 308, thereby adjusting the discharge amount of air to flow through the cathode discharge pipe 306 and then to be discharged from the discharge gas discharge port 309.

The fuel gas supply/discharge system 50 includes a fuel gas supply system 50A having an anode gas supply function, a fuel gas discharge system 50C having an anode gas discharge function, and a fuel gas circulation system 50B having an anode gas circulation function. The anode gas supply function means a function of supplying the anode gas containing a fuel gas to the anode of the fuel cell 20. The anode gas discharge function means a function of discharging an anode off-gas that is a discharge gas discharged from the anode of the fuel cell 20 to the outside. The anode gas circulation function means a function of circulating the anode off-gas containing hydrogen inside the fuel cell system 100.

The fuel gas supply system 50A supplies hydrogen as the anode gas to the anode of the fuel cell 20. The fuel gas supply system 50A includes an anode supply pipe 501, a fuel gas tank 51, an on/off valve 52, a regulator 53, an injector 54, and a pressure sensor 59.

The anode supply pipe 501 connects the fuel gas tank 51 as an anode gas source and the anode supply port 251 of the fuel cell 20 to each other. The fuel gas tank 51 is a container storing hydrogen at a high pressure from 10 to 70 Mpa, for example. The anode supply pipe 501 is used for guiding hydrogen to the anode of the fuel cell 20. The on/off valve 52 is provided in the anode supply pipe 501 at a position near the exit of the fuel gas tank 51. The on/off valve 52 in an open state is used for causing hydrogen to flow downstream from the fuel gas tank 51. The on/off valve 52 is an electric-operated valve or a solenoid valve with an amount of opening that becomes changeable in response to a control signal from the controller 60. The on/off valve 52 is usable for adjusting the supply amount of hydrogen to be supplied downstream. The regulator 53 is a pressure reducing valve and provided in the anode supply pipe 501 at a position downstream from the on/off valve 52, which is a position closer to the fuel cell 20. The regulator 53 adjusts the pressure of hydrogen in a place upstream from the injector 54 under control by the controller 60 to reduce this pressure to a level such as some Mpa, for example.

The injector 54 is provided in the anode supply pipe 501 at a position downstream from the on/off valve 52. The injector 54 functions as a fuel gas supplier that adjusts the supply amount of the anode gas to be supplied to the fuel cell 20 in response to opening and closing of a valve of the injector 54. More specifically, the injector 54 is controlled by the controller 60, and adjusts the supply amount of the anode gas by driving its on/off valve electromagnetically in response to a set driving cycle or valve open time. In response to downstream supply of hydrogen by the injector 54, internal pressures are increased in the anode supply pipe 501, in the anode of the fuel cell 20, and in the anode circulation pipe 502. The injector 54 may be subjected to abnormality of failing to close the internal solenoid valve at least temporarily (such abnormality may also be called "opening abnormality") or abnormality of failing to open the solenoid valve at least temporarily (such abnormality may also be called "closing abnormality") to be caused by mixture with incoming foreign substances, for example. The occurrence of the opening abnormality at the injector 54 may cause hydrogen to be supplied continuously to the fuel cell 20, for example, and this may cause trouble of increasing an internal pressure in the anode supply pipe 501 continuously. The occurrence of the closing abnormality at the injector 54 may cause trouble of failing to supply hydrogen sufficiently to the fuel cell 20, for example. In this case, an internal pressure in the anode supply pipe 501 continues to be reduced as a result of hydrogen consumption caused by power generation by the fuel cell 20, for example.

The pressure sensor 59 is provided in the anode supply pipe 501 at a position between the ejector 70 and the anode supply port 251. The pressure sensor 59 acquires an internal pressure in the anode supply pipe 501 at a position downstream from the ejector 70, and outputs the acquired internal pressure to the controller 60.

The fuel gas circulation system 50B separates the anode off-gas discharged from the anode of the fuel cell 20 into a gas component and a liquid component, and then causes the components to circulate through the anode supply pipe 501. The fuel gas circulation system 50B includes the anode circulation pipe 502, a gas-liquid separator 57, the circulation pump 55, and the ejector 70.

The anode circulation pipe 502 is used for guiding the anode off-gas discharged from the anode to the anode supply pipe 501. The anode circulation pipe 502 has one end connected to the anode discharge port 252 of the fuel cell 20, and the other end connected to the ejector 70. The gas-liquid separator 57 and the circulation pump 55 are provided in the anode circulation pipe 502.

The gas-liquid separator 57 is provided in the anode circulation pipe 502, separates the anode off-gas containing water vapor, nitrogen, and hydrogen as the anode gas into a gas component and a liquid component, and then stores the liquid component. The gas-liquid separator 57 is arranged in the anode circulation pipe 502 at a position between the circulation pump 55 and the anode discharge port 252.

The circulation pump 55 is arranged in the anode circulation pipe 502 at a position between the gas-liquid separator 57 and the anode supply pipe 501. The circulation pump 55 includes a motor 56 driven under control by the controller 60. By driving the motor 56, the circulation pump 55 feeds the anode off-gas having flowed into the anode circulation pipe 502 in a direction from the anode discharge port 252 toward the ejector 70. In the present embodiment, the circulation pump 55 further functions as a circulation stop unit that stops circulation of the anode gas in the anode supply pipe 501 in response to stop of the motor 56. If the anode gas is caused to circulate sufficiently by the injector 54 and the ejector 70, the circulation pump 55 is omissible. In this case, the fuel cell system 100 may include an on/off valve controllable by the controller 60, for example, instead of the circulation pump 55. The on/off valve functions as a circulation stop unit that stops circulation of the anode gas in the anode supply pipe 501 by being closed under control by the controller 60.

The ejector 70 is provided in the anode supply pipe 501 at a position between the injector 54 and the anode supply port 251. The ejector 70 sucks the anode off-gas in the anode circulation pipe 502 using negative pressure generated by injection of the anode gas by the injector 54. The ejector 70 causes the anode off-gas sucked from the anode circulation pipe 502 and the anode gas supplied from the injector 54 to flow together into the fuel cell 20. The ejector 70 uses the pressure of hydrogen stored in the fuel gas tank 51 as a working fluid for sucking the anode off-gas in the anode circulation pipe 502. In other words, energy generated during filling of the fuel gas tank 51 with compressed hydrogen gas is used for circulation of the anode gas. This allows the anode off-gas in the anode circulation pipe 502 to be sucked and to be caused to circulate through the anode supply pipe 501 without the need of providing a mechanism of increasing the pressure of hydrogen. The fuel cell system 100 having the foregoing configuration allows reduction in load on the circulation pump 55 and allows reduction in power consumption at the circulation pump 55. This further achieves omission or size reduction of the circulation pump 55.

The fuel gas discharge system 50C discharges the anode off-gas and liquid water stored in the gas-liquid separator 57 to the outside. The fuel gas discharge system 50C includes the anode discharge pipe 504 and an exhaust/drain valve 58. The anode discharge pipe 504 has one end connected to the anode circulation pipe 502 at a position between the circulation pump 55 and the anode discharge port 252. In the present embodiment, the one end of the anode discharge pipe 504 is connected to a discharge port of the gas-liquid separator 57. The anode discharge pipe 504 has the other end connected to the cathode discharge pipe 306 at a position between the cathode discharge port 232 and the discharge gas discharge port 309. The anode discharge pipe 504 is used for draining water from the gas-liquid separator 57 and discharging part of the anode off-gas passing through the gas-liquid separator 57 from the fuel gas supply/discharge system 50.

The exhaust/drain valve 58 is provided in the anode discharge pipe 504 and used for opening and closing a flow path in the anode discharge pipe 504. For example, a diaphragm valve is usable as the exhaust/drain valve 58. The exhaust/drain valve 58 is opened and closed under control by the controller 60. In the present embodiment, when the exhaust/drain valve 58 is opened, the liquid water and the anode off-gas stored in the gas-liquid separator 57 are discharged to the atmosphere through the cathode discharge pipe 306.

Figure 2:
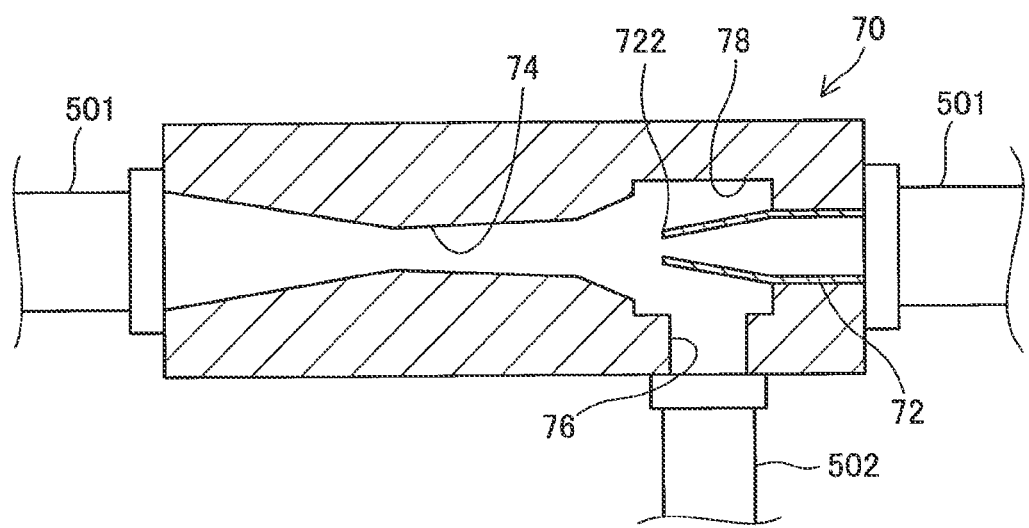
FIG. 2 is a schematic sectional view showing the internal configuration of an ejector.

FIG. 2 is a schematic sectional view showing the internal configuration of the ejector 70. The ejector 70 includes a nozzle 72, a suction port 76, a suction chamber 78, and a diffuser 74 provided inside the ejector 70. The nozzle 72 is connected to the anode supply pipe 501 at a downstream position from the injector 54. The nozzle 72 has a tip where an ejection port 722 is formed as an opening for ejection of the anode gas. The nozzle 72 is arranged in the suction chamber 78. The suction chamber 78 defines space for generating negative pressure around the nozzle 72. The suction chamber 78 is provided with the suction port 76 for suction of the anode off-gas in the anode circulation pipe 602. The anode circulation pipe 502 is connected to the suction port 76. The anode gas supplied from the injector 54 is ejected from the ejection port 722 at the tip of the nozzle 72. The anode off-gas in the anode circulation pipe 502 is sucked through the suction port 76 using the negative pressure generated in the suction chamber 78 as a result of ejection of the anode gas through the ejection port 722.

The diffuser 74 is a flow path for the anode gas at a position downstream from the nozzle 72. The flow path in the diffuser 74 has a tip to which the anode supply pipe 501 connected to the anode supply port 251 of the fuel cell 20 is connected. An upstream part of the flow path in the diffuser 74 is configured in such a manner that a sectional area becomes smaller gradually in a downstream direction. A downstream part of the flow path in the diffuser 74 is configured in such a manner that a sectional area becomes greater with a shorter distance to the tip. The diffuser 74 reduces the flow rate of a gas mixture flowing inside the diffuser 74 and converts the kinetic energy of the gas mixture to pressure. More specifically, on the upstream part of the diffuser 74, the anode gas supplied from the injector 54 and the anode off-gas sucked from the anode circulation pipe 502 are mixed. On the downstream part of the diffuser 74, the mixed fluids are compressed to be placed at a higher pressure.

If the fuel cell system 100 is exposed to a low-temperature environment, for example, moisture content, etc. contained in the anode off-gas sucked from the anode circulation pipe 502 may be cooled to be frozen during passage through a position near the ejection port 722 or through the diffuser 74. The occurrence of the freezing in the flow path in the ejector 70 such as that occurring at the diffuser 74 or the suction chamber 78 may cause difficulty in generating negative pressure in the suction chamber 78. As a result, the ejector 70 becomes incapable of sucking the anode off-gas in the anode circulation pipe 502 and causing the anode off-gas to circulate sufficiently, while it is still capable of supplying the anode gas from the injector 54 to the fuel cell 20. Compared to a pressure in the anode supply pipe 501 during normal time determined by supply of the anode gas by the injector 54 and circulation of the anode off-gas by the ejector 70, the difficulty in causing the anode off-gas to circulate through the anode supply pipe 501 reduces a pressure in the anode supply pipe 501 downstream from the ejector 70 by the loss of the amount of the circulating anode off-gas.

FIG. 3 is a flowchart showing abnormality judgment control performed by the controller 60 of the fuel cell system 100 of the present embodiment. This flow is started by the start of the operation of the fuel cell system 100, for example. This flow may be performed repeatedly at predetermined periods such as every few seconds, for example. If the fuel cell system 100 includes the circulation pump 55, judgment of abnormality at the circulation pump 55 is completed at the time of implementation of this flow, for example, so that the circulation pump 55 operates normally.

In step S10, the controller 60 acquires a first pressure P1 from the pressure sensor 59. In step S20, the controller 60 judges whether the first pressure P1 is within a predetermined management range. The predetermined management range means a possible range of an internal pressure in the anode supply pipe 501 during normal operation of the fuel cell system 100, and is settable using management standard for process capability, for example. In the present embodiment, the management range is set using a lower limit value LSL for detecting low-pressure side abnormality and an upper limit value USL for detecting high-pressure side abnormality. The upper limit value USL is preferably set to a pressure value sufficiently lower than a pressure value that might cause damage on each part of the fuel cell system 100.

The lower limit value LSL is preferably set to a pressure value higher than a pressure value that might cause shortage of supply of the anode gas to the fuel cell 20, for example. If the first pressure P1 is greater than the lower limit value LSL and less than the upper limit value USL, the controller 60 judges that the first pressure P1 is within the predetermined management range (S20: LSL<P1<USL), and finishes this flow.

If the first pressure P1 is equal to or greater than the upper limit value USL (S20: USL<P1), the controller 60 goes to step S40 and judges that the injector 54 has the opening abnormality. In step S42, the controller 60 takes action against abnormality responsive to the opening abnormality at the injector 54. The action against abnormality responsive to the opening abnormality at the injector 54 includes stopping supply of the anode gas from the fuel gas tank 51 by closing the on/off valve 52, reducing a pressure in the anode supply pipe 501, and making emergency stop of the fuel cell system 100, for example. In step S44, the controller 60 notifies the occurrence of the opening abnormality at the injector 54 to a user or an administrator of the fuel cell system 100, and to a driver or an administrator of a fuel cell vehicle equipped with the fuel cell system 100, for example. This notification may be given by a method of displaying the notification on a display of the fuel cell system 100 or of the fuel cell vehicle equipped with the fuel cell system 100, or by a method using voice output from a speaker, for example. Alternatively, the notification may be transmitted to an administrator at a distance using data communication through a network, for example. In addition to the notification of the opening abnormality at the injector 54, notification for urging stop of the fuel cell system 100 or stop of the fuel cell vehicle may be given. After the notification is given in step S44, the controller 60 finishes the process.

In step S20, if the first pressure P1 is equal to or less than the lower limit value LSL (S20: P1<LSL), the controller 60 goes to step S30. In the flow (also called "abnormality judgment") including step S30 and its subsequent steps described below, the controller 60 starts to make a discrimination between abnormality relating to supply of the anode gas by the injector 54 and abnormality relating to the fuel gas circulation system 50B including the ejector 70 and the anode circulation pipe 502. The abnormality judgment described below is made while the exhaust/drain valve 58 is closed. In making the abnormality judgment, output from the fuel cell 20 is not limited. In terms of increasing the accuracy of the abnormality judgment, however, output from the fuel cell 20 may be limited or power generation by the fuel cell 20 may be stopped during making of the abnormality judgment.

In step S30, the controller 60 performs the constant quantity supply control of setting the amount of the anode gas to be supplied by the injector 54 to a predetermined supply amount. For example, the controller 60 adjusts the supply amount of the anode gas to a constant amount by driving the on/off valve of the injector 54 in a driving cycle or for valve opening time corresponding to the predetermined supply amount. In the present embodiment, the controller 60 sets the predetermined supply amount using the supply amount of the anode gas necessary for power generation required in the fuel cell 20. Specifically, a substantial agreement is established between the supply amount of the anode gas supplied from the injector 54 to the fuel cell 20 under the constant quantity supply control and the amount of the anode gas consumed by power generation by the fuel cell 20. In terms of stopping circulation of the anode gas in step S32 described later, the controller 60 increases the set amount of the anode gas to be supplied by the injector 54 to a degree allowing compensation for a reduction in the amount of the anode gas to be supplied to the fuel cell 20 resulting from the circulation stop in step S32. The predetermined supply amount used in the constant quantity supply control may be set not only on the basis of power generation required in the fuel cell 20 but may be set freely. For example, the predetermined supply amount may be set to a supply amount greater than the supply amount of the anode gas corresponding to the power generation required in the fuel cell 20. The fuel cell system 100 having such a configuration allows the abnormality judgment to be made while an internal pressure in the anode supply pipe 501 is greater than the lower limit value LSL, making it possible to reduce the likelihood of exposure of each part of the fuel cell system 100 to a low-pressure environment.

In step S32, the controller 60 performs the circulation stop control of stopping circulation of the anode gas over the circulation pump 55. More specifically, the controller 60 stops the circulation pump 55 by stopping the motor 56 of the circulation pump 55, thereby stopping flow of the anode off-gas in the anode circulation pipe 502. By doing so, only the anode gas supplied at the constant supply amount from the injector 54 under the constant quantity supply control is to flow in the anode supply pipe 501.

In step S34, the controller 60 acquires a second pressure P2 from the pressure sensor 59. The second pressure P2 means an internal pressure in the anode supply pipe 501 in a period of making the abnormality judgment. If the fuel cell 20 generates power during making of the abnormality judgment, the second pressure P2 may be reduced by consumption of the anode gas resulting from power generation by the fuel cell 20. In the present embodiment, the controller 60 acquires the second pressure P2 several times within a predetermined period. In step S36, the controller 60 calculates a variation CP of the second pressure P2 per unit period using the several acquired values of the second pressure P2.

In step S38, the controller 60 compares the variation CP of the second pressure P2 and a predetermined pressure range PT. The pressure range PT is settable using a variation of pressure determined by giving consideration to pressure increase generated by the anode gas supplied from the injector 54 under the constant quantity supply control and pressure reduction caused by consumption of the anode gas resulting from power generation by the fuel cell 20, for example. In the present embodiment, as a substantial agreement is established between the amount of the anode gas supplied from the injector 54 under the constant quantity supply control and the amount of the anode gas consumed by power generation by the fuel cell 20, the pressure range PT is set using zero as an intermediate value, and to be a range from a lower limit value PTL to an upper limit value PTU determined on the basis of error of measuring by the pressure sensor 59 and error of the amount of supply of the anode gas from the injector 54. The pressure range PT is not limited to a range using zero as an intermediate value. If the anode gas is supplied to a greater amount than the supply amount of the anode gas necessary for power generation required in the fuel cell 20 under the constant quantity supply control, for example, the pressure range PT may be set using a value greater than zero as an intermediate value, which is a value corresponding to pressure increase resulting from this greater supply amount.

In step S38, if the variation CP of the second pressure P2 is greater than the pressure range PT, specifically, in the present embodiment, if the variation CP is greater than the upper limit value PTU (S38: PTU<CP), the controller 60 goes to step S70 and judges that the ejector 70 and the injector 54 operate normally. Then, the controller 60 finishes the process. The variation CP becomes greater than the upper limit value PTU in a case where, after the first pressure P1 reaches the lower limit value LSL, freezing in the ejector 70 or the closing abnormality at the injector 54 is resolved to increase the first pressure P1 again, for example.

In step S38, if the variation CP of the second pressure P2 is less than the pressure range PT, specifically, in the present embodiment, if the variation CP is less than the lower limit value PTL (S38: CP<PTL), the controller 60 goes to step S50 and judges that the injector 54 has the closing abnormality. In step S52, the controller 60 takes action against abnormality responsive to the closing abnormality at the injector 54. The action against abnormality responsive to the closing abnormality at the injector 54 includes imposing output limitation of reducing power output from the fuel cell 20 compared to required power in normal time, for example. In step S54, the controller 60 notifies the closing abnormality at the injector 54 to the user of the fuel cell system 100, for example, like in step S44. After step S54, the controller 60 finishes the process.

In step S38, if the variation CP of the second pressure P2 is within the pressure range PT, specifically, in the present embodiment, if the variation CP is equal to or greater than the lower limit value PTL and equal to or less than the upper limit value PTU (S38: PTL≤CP≤PTU), the controller 60 goes to step S60 and judges that the ejector 70 has abnormality. The controller 60 may judge that the fuel gas circulation system 50B including the ejector 70 and the anode circulation pipe 502 has abnormality. The abnormality at the ejector 70 includes freezing of liquid water in the flow path in the ejector 70 such as that occurring at the diffuser 74, for example.

In step S62, the controller 60 notifies the presence of the abnormality at the ejector 70 to the user of the fuel cell system 100, for example, like in step S44 and others. If the ejector 70 is judged to have the abnormality in step S60, the controller 60 does not take action against abnormality such as that in step S42 or step S52. This is based on the reason that, on the occurrence of the abnormality at the flow path in the ejector 70 such as freezing at the diffuser 74, the supply amount of the anode gas supplied from the injector 54, passed through the ejector 70, and then fed to the fuel cell 20 is not reduced, while the amount of the anode off-gas circulated from the anode circulation pipe 502 to the anode supply pipe 501 is reduced. On the other hand, for compensating for the shortage of the circulation amount, the controller 60 may take action against abnormality by performing control of increasing the amount of supply of hydrogen from the injector 54 or by performing control of reducing output from the fuel cell 20, for example. The controller 60 may also take action against abnormality for increasing the circulation amount of the anode off-gas by increasing the number of rotations of the circulation pump 55, for example.

FIG. 4 is a timing chart showing an example of a case where the controller 60 judges that the injector 54 has the closing abnormality. The top section of FIG. 4 includes a graph showing change in an internal pressure in the anode supply pipe 501 with time. The sections under this graph show on/off of the constant quantity supply control over the injector 54 and on/off of the circulation stop control of stopping the motor 56 of the circulation pump 55 performed by the controller 60, and on/off of action against abnormality taken by the controller 60.

At time t0, the occurrence of the closing abnormality at the injector 54 disables valve opening to reduce the amount of the anode gas supplied to the fuel cell 20. Thus, the first pressure P1 starts to be reduced. The first pressure P1 reaches the lower limit value LSL at time t1. At the time t1, the controller 60 transmits control signals to the injector 54 and the circulation pump 55 to start the constant quantity supply control over the injector 54 and the circulation stop control over the circulation pump 55. As shown in FIG. 4, even if the injector 54 accepts the control signal about the constant quantity supply control, the occurrence of the closing abnormality at the injector 54 disables valve opening. As a result, the second pressure P2 is still reduced after the time t1.

The controller 60 acquires the second pressure P2 several times in a predetermined period after starting the constant quantity supply control and the circulation stop control. At time t2 when the predetermined period has passed, the controller 60 calculates the variation CP of the second pressure P2 using the several acquired values of the second pressure P2. As shown in FIG. 4, as the variation CP is less than the lower limit value PTL, the controller 60 judges that the injector 54 has the closing abnormality at the time t2. The controller 60 takes action against abnormality responsive to the closing abnormality at the injector 54 by reducing power output from the fuel cell 20 compared to required power in normal time, for example. In addition to taking the action against abnormality, the controller 60 notifies the occurrence of the closing abnormality at the injector 54 to a user of the fuel cell system 100, for example.

FIG. 5 is a timing chart showing an example of a case where the controller 60 judges that the ejector 70 has abnormality. Each item shown in FIG. 5 is common to a corresponding item shown in FIG. 4. At time t3, on the occurrence of abnormality at the ejector 70 and at the anode circulation pipe 502 such as freezing of liquid water in the diffuser 74, for example, it becomes impossible to circulate the anode off-gas sufficiently into the anode supply pipe 501. As a result, the first pressure P1 starts to be reduced by a degree corresponding to reduction in the circulation amount of the anode off-gas. At time t4, the first pressure P1 reaches the lower limit value LSL. At the time t4, the controller 60 transmits control signals to the injector 54 and the circulation pump 55 to start the constant quantity supply control over the injector 54 and the circulation stop control over the circulation pump 55.

The controller 60 acquires the second pressure P2 several times, and calculates the variation CP of the second pressure P2 at time t5. As shown in FIG. 5, as the amount of the anode gas supplied from the injector 54 under the constant quantity supply control agrees with the amount of the anode gas consumed by power generation by the fuel cell 20, the variation CP of the second pressure P2 exhibits a value of nearly zero. As the variation CP is within the range from the lower limit value PTL to the upper limit value PTU, the controller 60 judges that the ejector 70 has abnormality. The controller 60 notifies the occurrence of the abnormality at the ejector 70 to a user of the fuel cell system 100, for example, without taking action against abnormality.

As described above, in the fuel cell system 100 of the present embodiment, if the first pressure P1 becomes equal to or less than the predetermined lower limit value LSL, the controller 60 performs the constant quantity supply control of supplying the anode gas of a predetermined supply amount over the injector 54, and performs the circulation stop control of stopping circulation through the anode circulation pipe 502 over the circulation pump 55. On the occurrence of abnormality at the fuel gas circulation system 50B including the ejector 70 and the anode circulation pipe 502, the amount of supply to the fuel cell 20 by the injector 54 is unlikely to be reduced, while the amount of circulation of the anode off-gas is reduced. This makes it possible to judge abnormality at the fuel gas circulation system 50B including the ejector 70 and the anode circulation pipe 502 using the second pressure P2 at the time of implementations of the constant quantity supply control and the circulation stop control.

In the fuel cell system 100 of the present embodiment, if the variation CP of the second pressure P2 is within the predetermined pressure range PT, the controller 60 judges that the ejector 70 has abnormality. If the variation CP of the second pressure P2 is less than the pressure range PT, the controller 60 judges that the injector 54 has the closing abnormality. This makes it possible to detect abnormality and to determine whether the detected abnormality relates to supply of the anode gas by the injector 54 or relates to the anode gas circulation by the ejector 70 and the anode circulation pipe 502.

In the fuel cell system 100 of the present embodiment, if the first pressure P1 becomes equal to or greater than the upper limit value USL, the controller 60 judges that the injector 54 has the opening abnormality. This makes it possible to detect abnormality relating to supply of the anode gas by the injector 54 in more detail.

In the fuel cell system 100 of the present embodiment, if the controller 60 judges that the injector 54 has the closing abnormality or the opening abnormality, the controller 60 takes action against abnormality by stopping supply of the anode gas to the fuel cell 20, by reducing a pressure in the anode supply pipe 501, by making emergency stop of the fuel cell system 100, or by reducing power output from the fuel cell 20, for example. If the controller 60 judges that the ejector 70 and the anode circulation pipe 502 have abnormality, the controller 60 does not take action against abnormality. Thus, it becomes possible to reduce or eliminate the probability that action against abnormality will be taken and output from the fuel cell 20 will be limited even if supply of the anode gas to the fuel cell 20 is still possible to allow acquisition of power generated by the fuel cell 20, like in a case on the occurrence of abnormality at the circulation system composed of the ejector 70 and the anode circulation pipe 502. This makes it possible to reduce or eliminate the probability that the performance of the fuel cell system 100 will be limited unnecessarily.

B. Other Embodiments (B1) In the above-described embodiment, as the controller 60 stops the motor 56, the circulation pump 55 stops circulation of the anode off-gas in the anode supply pipe 501. By contrast, as the controller 60 drives the motor 56 to rotate in a reverse direction, for example, the circulation pump 55 may stop circulation of the anode off-gas into the anode supply pipe 501 by feeding hydrogen in the anode supply pipe 501 in a direction from the anode supply pipe 501 toward the anode discharge port 252. The fuel cell system 100 having such a configuration makes it possible to stop circulation of the anode off-gas into the anode supply pipe 501 more reliably under the circulation stop control. This effect becomes notable, particularly if the anode gas flowing in the anode circulation pipe 502 unintentionally passes through the circulation pump 55 while the motor 56 stops. If the motor 56 is a three-phase induction motor, for example, the rotation direction of the circulation pump 55 may be switched by changing order in which a current is to flow in coils of two phases. A direction of gas feeding using the circulation pump 55 may be switched by switching an installation direction of the circulation pump 55 or switching a flow path in the circulation pump 55, in addition to using the rotation direction of the motor 56.

(B2) In the above-described embodiment, the controller 60 uses the variation CP of the second pressure P2 in making the abnormality judgment. By contrast, the controller 60 may use the second pressure P2 instead of the variation CP of the second pressure P2 in making the abnormality judgment. In this case, the controller 60 compares the second pressure P2 and a predetermined threshold when a predetermined period has passed after start of the abnormality judgment, for example. The threshold is settable using a pressure determined by giving consideration to pressure increase generated by the anode gas supplied from the injector 54 under the constant quantity supply control and pressure reduction caused by consumption of the anode gas resulting from power generation by the fuel cell 20, for example. If a substantial agreement is established between the amount of the anode gas supplied from the injector 54 under the constant quantity supply control and the amount of the anode gas consumed by power generation by the fuel cell 20, for example, the threshold may be set using the same pressure as a pressure obtained at the time of start of the abnormality judgment or as the second pressure P2 acquired in step S34. The threshold is not limited to the same pressure as a pressure obtained at the time of start of the abnormality judgment or as the second pressure P2 acquired in step S34. If the anode gas is supplied to a greater amount than the supply amount of the anode gas necessary for power generation required in the fuel cell 20 under the constant quantity supply control, for example, the threshold may be set using a value corresponding to pressure increase resulting from this greater supply amount. The threshold is preferably set within a range from a lower limit value to an upper limit value in consideration of error of measuring by the pressure sensor 59 or error of the amount of supply of the anode gas by the injector 54. If the second pressure P2 agrees with the threshold, the controller 60 judges that the ejector 70 has abnormality. The second pressure P2 agreeing with the threshold means a case including a state where the second pressure P2 completely agrees with the threshold, and a state where the variation CP of the second pressure P2 is within this predetermined range, namely, within a range from the lower limit value to the upper limit value. In this case, the second pressure P2 being less than the threshold means a state in which the second pressure P2 is less than the lower limit value of the threshold. If the second pressure P2 is less than the threshold, the controller 60 judges that the injector 54 has the closing abnormality. The second pressure P2 being greater than the threshold means a state in which the second pressure P2 is greater than the upper limit value of the threshold. If the second pressure P2 is greater than the upper limit value, the controller 60 judges that the ejector 70 and the injector 54 operate normally. Then, the controller 60 finishes the process.

The present disclosure is not limited to the embodiments described above and is able to be realized with various configurations without departing from the spirit thereof. For example, technical features in the embodiments may be replaced with each other or combined together as necessary in order to solve part or the whole of the problems described previously or to achieve part or the whole of the effects described previously. When the technical features are not described as essential features in the present specification, they are able to be deleted as necessary. For example, the present disclosure may be realized with embodiments which will be described below.

(1) According to one aspect of the present disclosure, a fuel cell system is provided. The fuel cell system includes: a fuel cell including an anode supply port and an anode discharge port; an anode supply pipe connected to the anode supply port; a fuel gas supplier disposed at the anode supply pipe, the fuel gas supplier configured to adjust a supply quantity of a fuel gas to be supplied to the fuel cell; an ejector disposed at the anode supply pipe at a position between the fuel gas supplier and the anode supply port; an anode circulation pipe connected to the anode discharge port and the ejector; a circulation stop unit disposed at the anode circulation pipe, the circulation stop unit configured to stop circulation of the fuel gas through the anode circulation pipe; a pressure sensor configured to detect a pressure in the anode supply pipe at a position between the ejector and the anode supply port; and a controller configured to control the fuel gas supplier and the circulation stop unit, wherein when a first pressure acquired from the pressure sensor is equal to or less than a predetermined lower limit value, the controller may control the fuel gas supplier to perform constant quantity supply control to supply the fuel gas of a predetermined supply quantity, and may control the circulation stop unit to perform circulation stop control to stop the circulation through the anode circulation pipe, and the controller may determine abnormality at the ejector and the anode circulation pipe by using a second pressure acquired from the pressure sensor after the fuel gas supplier performs the constant quantity supply control and the circulation stop unit performs the circulation stop control. In the fuel cell system of this aspect, using the second pressure acquired after implementations of the constant quantity supply control and the circulation stop control makes it possible to detect abnormality at an anode gas circulation system including the ejector and the anode circulation pipe.

(2) In the fuel cell system of the foregoing aspect, when the second pressure agrees with a predetermined threshold or when a variation of the second pressure per unit period is within a predetermined pressure variation range, the controller may determine that the ejector has abnormality, and when the second pressure is less than the threshold or when the variation of the second pressure is less than the pressure variation range, the controller may determine that the fuel gas supplier has closing abnormality. The fuel cell system of this aspect makes it possible to detect abnormality and to determine whether the detected abnormality relates to supply of an anode gas by the fuel gas supplier or relates to the anode gas circulation system including the ejector and the anode circulation pipe.

(3) In the fuel cell system of the foregoing aspect, when the first pressure is equal to or greater than a predetermined upper limit value, the controller may determine that the fuel gas supplier has opening abnormality. The fuel cell system of this aspect makes it possible to detect abnormality relating to supply of the anode gas by the fuel gas supplier in more detail.

(4) In the fuel cell system of the foregoing aspect, the controller may be configured to take action against abnormality including at least one of stopping the fuel cell system and imposing limitation on output from the fuel cell, the controller may not take the action against abnormality when the controller determines that the ejector has abnormality, and the controller may take the action against abnormality when the controller determines that the fuel gas supplier has closing abnormality or opening abnormality. The fuel cell system of this aspect makes it possible to reduce or eliminate the probability that the performance of the fuel cell system will be limited unnecessarily.

The present disclosure is able to be realized in various aspects. These aspects include a method of controlling a fuel cell system, a vehicle equipped with a fuel cell system, a method of judging abnormality at an anode gas flow path, a computer program for realizing these methods, and a storage medium storing such a computer program, etc.

What is claimed is:

1. A fuel cell system comprising:
a fuel cell including an anode supply port and an anode discharge port;
an anode supply pipe connected to the anode supply port;
a fuel gas supplier disposed at the anode supply pipe, the fuel gas supplier configured to adjust a supply quantity of a fuel gas to be supplied to the fuel cell;
an ejector disposed at the anode supply pipe at a position between the fuel gas supplier and the anode supply port;
an anode circulation pipe connected to the anode discharge port and the ejector;
a circulation stop unit disposed at the anode circulation pipe, the circulation stop unit configured to stop circulation of the fuel gas through the anode circulation pipe;
a pressure sensor configured to detect a pressure in the anode supply pipe at a position between the ejector and the anode supply port; and
a controller programmed to control the fuel gas supplier and the circulation stop unit, wherein
when a first pressure acquired from the pressure sensor is equal to or less than a predetermined lower limit value,
the controller is programmed to control the fuel gas supplier to perform constant quantity supply control to supply the fuel gas at a predetermined supply quantity, and control the circulation stop unit to perform circulation stop control to stop the circulation of the fuel gas through the anode circulation pipe, and
the controller is programmed to determine an abnormality at the ejector and the anode circulation pipe by using a second pressure acquired from the pressure sensor after the fuel gas supplier performs the constant quantity supply control and the circulation stop unit performs the circulation stop control.

2. The fuel cell system according to claim 1, wherein
when the second pressure is equal to a predetermined threshold or when a variation of the second pressure per unit period is within a predetermined pressure variation range, the controller is programmed to determine that the ejector has an abnormality, and
when the second pressure is less than the predetermined threshold or when the variation of the second pressure per unit period is less than the predetermined pressure variation range, the controller is programmed to determine that the fuel gas supplier has a closing abnormality.

3. The fuel cell system according to claim 1, wherein
when the first pressure is equal to or greater than a predetermined upper limit value, the controller is programmed to determine that the fuel gas supplier has an opening abnormality.

4. The fuel cell system according to claim 2, wherein
the controller is programmed to take action against abnormality including at least one of stopping the fuel cell system and imposing a limitation on output from the fuel cell,
the controller is programmed not to take the action against abnormality when the ejector has an abnormality, and
the controller is programmed to take the action against abnormality when the fuel gas supplier has the closing abnormality or an opening abnormality.

5. A method of controlling a fuel cell system, wherein the fuel cell system comprises a fuel cell including an anode supply port and an anode discharge port, an anode supply pipe connected to the anode supply port, an ejector disposed at the anode supply pipe, an anode circulation pipe connected to the anode discharge port and the ejector,
the method comprising;
when a first pressure in the anode supply pipe is equal to or less than a predetermined lower limit value,
stopping circulation of a fluid through the anode circulation pipe, and supplying a fuel gas at a predetermined supply quantity to the fuel cell, and
wherein abnormality at the ejector and the anode circulation pipe is determined using a second pressure in the anode supply pipe after stopping the circulation of the fluid through the anode circulation pipe and supplying the fuel gas at the predetermined supply quantity to the fuel cell.

* * * * *